(12) United States Patent
Liu et al.

(10) Patent No.: US 12,553,566 B2
(45) Date of Patent: Feb. 17, 2026

(54) CALIBRATION SUPPORT, AND POSITIONING METHOD FOR CALIBRATION ELEMENT APPLIED TO CALIBRATION SUPPORT

(71) Applicant: Autel Intelligent Technology Corp., Ltd., Shenzhen (CN)

(72) Inventors: Lianjun Liu, Shenzhen (CN); Biwang Lai, Shenzhen (CN); Kaikai Zhang, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 744 days.

(21) Appl. No.: 17/934,205

(22) Filed: Sep. 22, 2022

(65) Prior Publication Data

US 2023/0010071 A1 Jan. 12, 2023

Related U.S. Application Data

(63) Continuation of application No. PCT/CN2021/081052, filed on Mar. 16, 2021.

(30) Foreign Application Priority Data

Apr. 1, 2020 (CN) .......................... 202010252189.9

(51) Int. Cl.
*F16M 11/16* (2006.01)
*F16M 11/04* (2006.01)
(Continued)

(52) U.S. Cl.
CPC ........... *F16M 11/18* (2013.01); *F16M 11/045* (2013.01); *F16M 11/046* (2013.01);
(Continued)

(58) Field of Classification Search
CPC ...... G06T 7/70; F16M 11/045; F16M 11/046; F16M 11/08
See application file for complete search history.

(56) References Cited

U.S. PATENT DOCUMENTS

| 7,121,011 B2 | 10/2006 | Murray et al. |
| 10,634,488 B2 | 4/2020 | Stieff et al. |

(Continued)

FOREIGN PATENT DOCUMENTS

| AU | 2019263751 A1 | 12/2020 |
| CA | 3098643 A1 | 11/2019 |

(Continued)

OTHER PUBLICATIONS

The first office action of CN application No. 202010252189.9 issued on Jan. 30, 2024.

(Continued)

*Primary Examiner* — Laura Martin
(74) *Attorney, Agent, or Firm* — Andrew C. Cheng

(57) ABSTRACT

A calibration support includes a support body (100) configured to mount a calibration element, the calibration element being configured to calibrate a driving assistance system of a vehicle (500); an image acquisition device (200) connected to the support body (100) and configured to acquire an image of the vehicle (500); a processing device (300) provided on the support body (100), electrically connected to the image acquisition device (200), and configured to calculate, according to the image acquired by the image acquisition device (200), the movement position of the support body (100) relative to the vehicle (500) and output a control signal comprising the movement position; and a control device (400) provided on the support body (100), electrically con- (Continued)

nected to the processing device (300), and configured to receive the control signal and control the support body (100) to move.

11 Claims, 14 Drawing Sheets

(51) Int. Cl.
| | | |
|---|---|---|
| *F16M 11/08* | (2006.01) | |
| *F16M 11/18* | (2006.01) | |
| *F16M 11/42* | (2006.01) | |
| *G01S 7/40* | (2006.01) | |
| *G01S 13/931* | (2020.01) | |
| *G06T 7/20* | (2017.01) | |
| *G06T 7/70* | (2017.01) | |
| *H04N 23/54* | (2023.01) | |

(52) U.S. Cl.
CPC ............ *F16M 11/08* (2013.01); *F16M 11/42* (2013.01); *G01S 7/40* (2013.01); *G01S 13/931* (2013.01); *G06T 7/20* (2013.01); *G06T 7/70* (2017.01); *G06T 2207/30244* (2013.01); *G06T 2207/30252* (2013.01); *H04N 23/54* (2023.01)

(56) References Cited

U.S. PATENT DOCUMENTS

| | | | |
|---|---|---|---|
| 2005/0096807 A1 | 5/2005 | Murray et al. | |
| 2019/0249985 A1* | 8/2019 | Stieff | G01M 17/06 |
| 2019/0331482 A1* | 10/2019 | Lawrence | G01S 7/4052 |
| 2020/0208968 A1 | 7/2020 | Stieff et al. | |

FOREIGN PATENT DOCUMENTS

| | | | |
|---|---|---|---|
| CN | 1764818 A | | 4/2006 |
| CN | 100373129 C | | 3/2008 |
| CN | 210000241 U | | 1/2010 |
| CN | 108318870 A | | 7/2018 |
| CN | 108345321 A | | 7/2018 |
| CN | 108454584 A | | 8/2018 |
| CN | 108594187 A | | 9/2018 |
| CN | 208179467 U | * | 12/2018 |
| CN | 109791045 A | | 5/2019 |
| CN | 209521630 U | | 10/2019 |
| CN | 110542376 A | | 12/2019 |
| CN | 209727042 U | | 12/2019 |
| CN | 111457226 A | | 7/2020 |
| CN | 111537015 A | | 8/2020 |
| CN | 212363263 U | | 1/2021 |
| CN | 112352146 A | | 2/2021 |
| DE | 10114799 A1 | | 10/2002 |
| EP | 1623185 B1 | | 8/2010 |
| EP | 3523604 B1 | | 5/2020 |
| EP | 3708949 A1 | | 9/2020 |
| KR | 20210003245 A | | 1/2021 |
| WO | 2004102114 A1 | | 11/2004 |
| WO | 2018067354 A1 | | 4/2018 |
| WO | 2019062767 A1 | | 4/2019 |
| WO | 2019211756 A1 | | 11/2019 |
| WO | 2020136623 A1 | | 7/2020 |
| WO | 2020141455 A1 | | 7/2020 |

OTHER PUBLICATIONS

The search report of CN application No. 202010252189.9 issued on Jan. 30, 2024.
International Search Report of PCT Patent Application No. PCT/CN2021/081052 issued on Jun. 9, 2021.

* cited by examiner

CALIBRATION SUPPORT, AND POSITIONING METHOD FOR CALIBRATION ELEMENT APPLIED TO CALIBRATION SUPPORT

CROSS-REFERENCE

The present application is a continuation of International Patent Application No. PCT/CN2021/081052 filed on Mar. 16, 2021, which claims the priority to the Chinese patent application No. 202010252189.9 entitled "Calibration Support, and Positioning Method for Calibration Element Applied to Calibration Support" filed on Apr. 1, 2020, to the China National Intellectual Property Administration, the entire contents of which are incorporated herein by reference.

TECHNICAL FIELD

The present application relates to the technical field of automobile calibration, and more particularly to calibration support, and a positioning method for a calibration element applied to calibration support.

BACKGROUND ART

An advanced driver assistant system, referred to as ADAS, is an active safety technology to use a variety of sensors mounted on a vehicle to collect environmental data inside and outside the vehicle immediately, and perform technical processing such as the identification, detection, and tracking of static and dynamic objects, so as to enable a driver to detect a possible danger at the fastest time, so as to draw attention and improve the safety. ADAS uses sensors such as cameras, radars, lasers, ultrasonic waves, etc. to detect light, heat, pressure, or other variables used to monitor the condition of the vehicle. The sensors are typically on the front and rear bumpers, side-view mirrors, the inside of a steering column, or a windshield. During the use of the vehicle, vibrations, collisions, ambient temperature and humidity, etc. may change the physical installation state of the above-mentioned sensors so that an adjustment or a calibration needs to be performed irregularly. When calibrating such sensors, it is common to mount a calibration element to calibration support and, by straightening the calibration support, align the calibration element with the vehicle.

Currently, the placement line of the calibration support is determined primarily by manually positioning points, and scribing lines, and then the calibration support is dragged to the placement line and the calibration element is aligned. In the calibration process, the operator not only needs to drag the calibration support, but also needs to observe whether the calibration support meets the placement requirements. On the one hand, it is easy to make mistakes and it has low accuracy by visual observation; on the other hand, it needs to adjust the calibration support back and forth, which has a complex operation and low working efficiency.

SUMMARY OF THE INVENTION

Embodiments of the present invention are intended to provide calibration support that automatically adjusts the position of the calibration support relative to the calibration equipment without requiring an operator to manually adjust the calibration support, which is convenient and highly accurate.

The embodiments of the present invention solve the technical problems by adopting the following technical solutions: providing a calibration support comprising: a support body for mounting a calibration element, the calibration element being used for calibrating a driving assistance system of a vehicle;

an image acquisition device connected to the support body for acquiring an image of the vehicle;

a processing device provided on the support body and electrically connected to the image acquisition device, being used for calculating the movement position of the support body relative to the vehicle according to the image acquired by the image acquisition device, and outputting a control signal containing the movement position; and a control device provided on the support body and electrically connected to the processing device, being used for receiving the control signal and, according to the control signal, controlling a movement of the support body.

In some embodiments, the support body comprises: a base comprising a roller, the roller being driven by the control device to roll.

In some embodiments, the support body further comprises: a stand assembly mounted to the base and provided in a vertical direction:

wherein the processing device and the control device are provided in the stand assembly.

In some embodiments, the support body further comprises: a cross beam assembly mounted to the stand assembly for mounting the image acquisition device.

In some embodiments, the cross beam assembly is movable in the vertical direction relative to the stand assembly;

wherein a moving distance of the cross beam assembly in the vertical direction is determined by the processing device, or a movement of the cross beam assembly is driven by the control device.

In some embodiments, the cross beam assembly is rotatable about a central axis of the stand assembly such that the cross beam assembly is perpendicular to a central plane of the vehicle;

wherein a rotation angle of the cross beam assembly about the central axis of the stand assembly is determined by the processing device, or a rotation of the cross beam assembly about the central axis of the stand assembly is driven by the control device.

In some embodiments, the cross beam assembly comprises a sliding block and a horizontal guide rail, the sliding block being mounted to the horizontal guide rail, and the sliding block being movable in a horizontal direction along the horizontal guide rail;

wherein the sliding block is used for mounting one of the image acquisition device and the calibration element.

In some embodiments, the moving distance of the sliding block in the horizontal direction along the horizontal guide rail is determined by the processing device, or the movement of the sliding block in the horizontal direction along the horizontal guide rail is driven by the control device.

The invention also provides a positioning method for a calibration element which is mounted on the calibration support described above, the method comprising steps as follows:

the image acquisition device acquiring an outer contour image of the vehicle;

the processing device determining the position of the image acquisition device relative to a central line of the vehicle according to the outer contour image of the vehicle;

the processing device determining the position of the calibration support relative to the central line of the vehicle according to the position of the image acquisition device relative to the central line of the vehicle and the center position of the image acquisition device relative to the calibration support;

the processing device determining the first movement information about the calibration support according to the position of the calibration support relative to the central line of the vehicle and a first preset position of the calibration support relative to the central line of the vehicle, and outputting a first control instruction containing the first movement information to the control device;

the control device controlling the calibration support to move to the first preset position according to the first control instruction;

wherein the first preset position is a calibration position of the calibration support relative to the vehicle.

In some embodiments, after the control device controls the calibration support to move to the first preset position according to the control instruction, the method further comprises steps as follows:

the image acquisition device acquiring an image of equipment to be calibrated on the vehicle;

the processing device determining the position of the image acquisition device relative to the equipment to be calibrated according to the image of the equipment to be calibrated;

the processing device determining second movement information about the image acquisition device relative to the calibration support according to the position of the image acquisition device relative to the equipment to be calibrated and a second preset position of the calibration element relative to the equipment to be calibrated, and outputs a second control instruction containing the second movement information to the control device;

the control device controlling the image acquisition device to move to the second preset position according to the second control instruction;

wherein the second preset position is a calibration position of the calibration element relative to the equipment to be calibrated.

Compared with the prior art, the calibration support in the embodiment comprises: a support body configured to mount a calibration element, the calibration element being configured to calibrate a driving assistance system of a vehicle; an image acquisition device connected to the support body and configured to acquire an image of the vehicle; a processing device provided on the support body, electrically connected to the image acquisition device, and configured to calculate, according to the image acquired by the image acquisition device, the movement position of the support body relative to the vehicle and output a control signal comprising the movement position; and a control device provided on the support body, electrically connected to the processing device, and configured to receive the control signal and, according to the control signal, control the support body to move.

Embodiments of the present invention can automatically acquire an image of a vehicle, automatically calculate the position of a support moving relative to the vehicle according to the acquired image, and control the support body to move to the position, thereby greatly reducing the complexity of the operation, improving the accuracy, reliability, and working efficiency of calibration equipment, and improving the competitiveness as well.

BRIEF DESCRIPTION OF THE DRAWINGS

One or more embodiments are illustrated by way of examples with a figure in the corresponding drawings. The illustrative examples are not to be construed as limiting the embodiments. In the drawings, elements having the same reference numeral designations represent like elements, and unless otherwise specified, the drawings are not to scale.

DETAILED DESCRIPTION OF THE INVENTION

Figure 1:
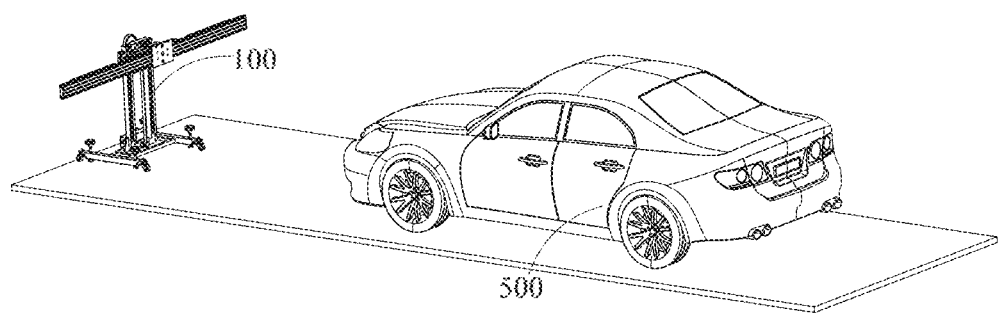
FIG. 1 is a view showing an application scenario of calibration support according to an embodiment of the present invention.

In order that the present invention may be readily understood, a more particular description of the invention will be rendered by reference to specific embodiments and the accompanying drawings. It needs to be noted that when an element is referred to as being "fixed" to another element, it can be directly on another element or one or more intermediate elements may be present between the elements. When one element is referred to as being "connected" to another element, it can be directly connected to the other element or one or more intermediate elements may be present between the elements. As used herein, orientational or positional relationships indicated by the terms "upper", "lower". "inner", "outer", "vertical", "horizontal", and the like are based on the orientational or positional relationships shown in the drawings, and are merely for the convenience in describing and simplifying the present invention, and do not indicate or imply that the referenced devices or elements must have a particular orientation, be constructed and operated in a particular orientation, and thus are not to be construed as limiting the present invention. Furthermore, the terms "first", "second", and the like are used for descriptive purposes only and are not to be construed as indicating or implying relative importance.

Unless defined otherwise, all technical and scientific terms used in the description have the same meaning as commonly understood by one of ordinary skill in the art to which this invention belongs. The terms used in the description of the present invention are for the purpose of describing specific embodiments only and are not intended to be limiting of the present invention. As used in the description, the term "and/or" includes any and all combinations of one or more of the associated listed items.

Furthermore, the technical features involved in various embodiments of the present invention described below can be combined as long as they do not conflict with each other.

Figure 2:
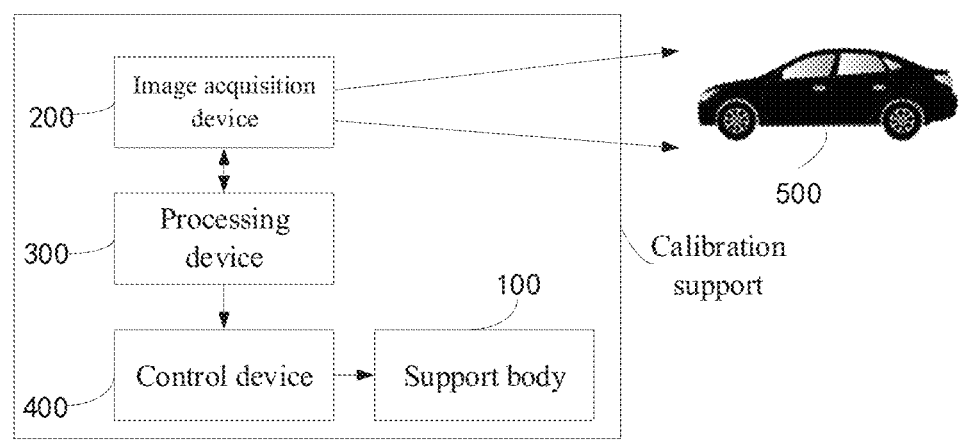
FIG. 2 is a diagram of the connections between the components of calibration support according to an embodiment of the present invention.

Referring to FIGS. 1 and 2 together, an embodiment of the present invention provides a calibration support comprising a support body 100, an image acquisition device 200, a processing device 300, and a control device 400. The support body 100 is used to mount a calibration element, which is a driving assistance system for calibrating a vehicle 500. The image acquisition device 200 is connected to the support body 100 for acquiring an image of the vehicle 500. The image acquisition device 200 refers to a device that has the function of acquiring an image and may process the image, such as performing format conversion, storage, pixel calculation, trimming or assignment, etc. on the image. The image acquisition device 200 may include an image acquisition sensor, or the image acquisition device 200 may be a camera or a video camera or like devices. The processing device 300 is provided at the support body 100 and electrically connected to the image acquisition device 200 for calculating a movement position of the support body 100 relative to the vehicle 500 according to an image acquired by the image acquisition device 200 and outputting a control signal including the movement position. The processing device 300 may be a processor, a microprocessor, or like devices having the operational capability. The processing device 300 may be integrated with the image acquisition device 200, such as on a printed circuit board or an application-specific integrated circuit (ASIC). Or the processing device 300 may be provided separately from the image acquisition device 200, such as separately at two places of the support body 100, the two communicating by wired or wireless means. The control device 400 is provided at the support body 100 and electrically connected to the processing device 300 for receiving the control signal and controlling the support body 100 to move according to the control signal. The control device 400 may include a driver capable of driving a movable component in the support body 100, thereby allowing the support body 100 to be controlled by the control device 400. The control device 400 may control the moving direction, moving distance, a moving manner, etc. of the support body 100. It will be understood that the control device 400 may actuate the support body 100 to move or may actuate the support body to stop. The control device 400 may be provided near a movable component of the support body 100. The control device 400 and the processing device 300 may be electrically connected by wired or wireless communication means. The number of control devices 400 may be one or more, or the number of control devices 400 may be related to the number of movable components of the support body, e.g. identical, etc.

Figure 3:
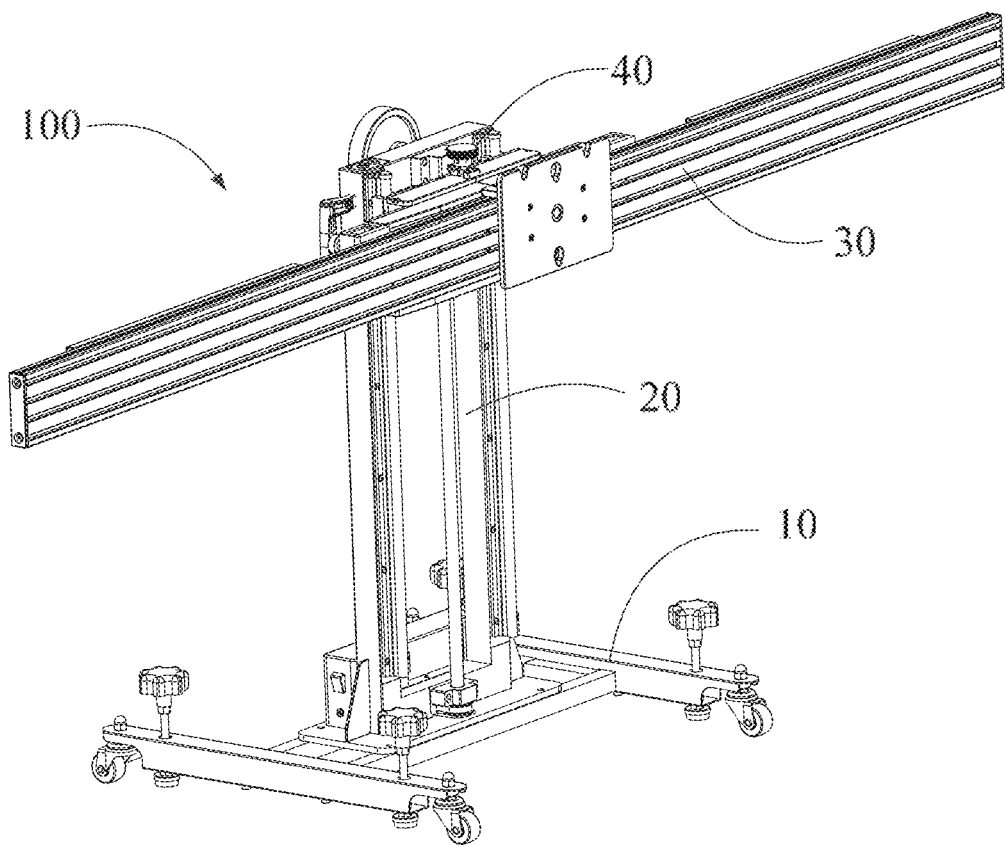
FIG. 3 is a schematic view showing a structure of a support body in the calibration support shown in FIG. 1.

An embodiment of the present application illustrates a structure of a movable support body 100, and it will be understood that other structures for calibrating a support body of a vehicle driver assistant system are within the scope of the present application. Referring to FIG. 3, the support body 100 includes a base 10, a stand assembly 20, a cross beam assembly 30, and a trimming assembly 40. The processing device 300 and the control device 400 are both provided in the stand assembly 20. The stand assembly 20 may also be used to house electrical wires and the like for transmitting electrical signals. Of course, the processing device 300, the control device 400, the wires, etc. may be housed in the base 10 or the cross beam assembly 30, or the device may be housed in an external component that is attached to the external surface of the base 10, the stand assembly 20, the cross beam assembly 30, or the trimming assembly 40. It will be understood that the support body 100 may also be provided with a power supplying device including a battery for supplying power to an image acquisition device, a processing device, and a control device. The battery may be zinc-manganese battery, alkaline battery, nickel-cadmium battery, and lithium battery, or a rechargeable battery, etc. Alternatively, the power supplying device may be detachably mounted to the support body, or the power supplying device may be fixedly mounted to the support body 100.

The stand assembly 20 is mounted to the base 10 and arranged in a vertical direction. The cross beam assembly 30 is mounted to the stand assembly 20 and is movable up and down along the vertical direction relative to the stand assembly 20, the cross beam assembly 30 being used for mounting the image acquisition device 200. The image acquisition device 200 may move along the cross beam assembly 30 in the horizontal direction, or the image acquisition device 200 may move relative to the stand assembly 20 along the vertical direction via the cross beam assembly 30. Alternatively, the movement range of the image acquisition device 200 may not be limited by the cross beam assembly 30. The movement of the image acquisition device 200 in any direction relative to the support body 100 may be implemented by other movable mechanisms, or the movement height may be higher than the stand assembly 20, or the horizontally moving distance may be outside the length range of the cross beam assembly 30, or at least two of the above three methods are combined.

Alternatively, the image acquisition device 200 may be combined with the above-mentioned movable mechanism by means of the movement mode of the cross beam assembly 30. For example, the case that the movable mechanism is provided on the cross beam assembly 30, the image acquisition device 200 may move in the vertical direction via the cross beam assembly 30, and the image acquisition device 200 may be placed at a position out of the range of the movement in the vertical direction by the movable mechanism, or the movable mechanism may be move in the horizontal direction along the cross beam assembly 30. The image acquisition device 200 may be placed at a position out of the range of the movement in the horizontal direction via the movable mechanism when one end of the cross beam assembly 30 is reached, or a position on the cross beam where the movement is limited is reached. In an embodiment of the present application, the movement of the cross beam assembly 30 in the vertical direction, or the movement of the moveable mechanism, may be controlled by the control device 400.

The number of the image acquisition devices 200 may be one. The image acquisition device 200 is connected to the support body 100 through a movable mechanism, or mounted to the cross beam assembly 30. The processing device 300 can acquire a vehicle image acquired by the image acquisition device 200 in real time, and judge whether the vehicle outline in the image can be used to calculate the position of the support body 100 relative to the vehicle 500. If not, the processing device 300 sends a control instruction to the control device 400, and the control device 400 controls the position movement of the image acquisition device 200 to move, such as moving to the position indicated by the control instruction, or the control device 400 controls the movement of the image acquisition device 200 according to the movement direction, moving distance, movement angle, etc. of the control instruction, or the control device 400 controls the image acquisition device 200 to move randomly. The image acquisition device 200 feeds back an image to the processing device 300 in real time. After detecting that the vehicle outline in the image can be used to calculate the position of the support body 100 relative to the vehicle 500, the processing device 300 can control the image acquisition device 200 to stop moving via the control device 400.

The number of the image acquisition devices 200 may be two or more, the position of the image acquisition devices may be fixed relative to the support body 100, or each of the image acquisition devices 200 may be mounted to the support body 100 by one of the above-described mounting manners of the image acquisition device 200. Two or more image acquisition devices 200 may simultaneously acquire images. The processing device 300 performs splicing processing on the images acquired by each image acquisition device 200 to determine whether the acquired vehicle outline can be used to calculate the position of the support body 100 relative to the vehicle 500. Alternatively, the processing device 300 may control one or more of the two or more image acquisition devices 200 to perform image acquisition. Two or more image acquisition devices 200 may all face the vehicle 500; or, concerning the two or more image acquisition devices 200, a part of the image acquisition devices 200 faces the vehicle 500, and the other part of the image acquisition devices 200 faces the support body 100, the relative positions of the two parts of the image acquisition devices 200 are known or can be known, and then the processing device 300 can respectively obtain the images of the two parts, and then get to know the position of the support body 100 relative to the vehicle 500; alternatively, concerning the two or more image acquisition devices 200, a first part of the image acquisition devices faces the vehicle and a second part of the image acquisition devices faces the first part of the image acquisition devices, the position of the second part of the image acquisition devices relative to the support body 100 is known or can be known, and then the processing device 300 can determine the position of the support body 100 relative to the vehicle 500 by the images acquired by the two parts of the image acquisition devices.

The above-described manner is not only applicable to the case where the image acquisition device 200 acquires an image of the vehicle 500, and the processing device 300 determines the position of the support body 100 relative to the vehicle 500 according to the image of the image acquisition device 200, and further controls the movement of the support body 100 by the control device 400; the above-mentioned manner is also applicable to an image of equipment to be calibrated on the vehicle acquired by the image acquisition device 200, where the processing device 300 determines the position of the image acquisition device 200 relative to the equipment to be calibrated according to the image of the image acquisition device 200, and further controls the image acquisition device 200 to move to a specific position via the control device 400.

Alternatively, the image acquisition device 200 may be detachably mounted to the support body 100, and the image acquisition device 200 may be mounted to different positions of the support body 100 according to the requirements. If it is required to control the overall movement of the support body 100, the image acquisition device 200 can be mounted to the above-mentioned movable mechanism or the cross beam assembly 30, and the position of the support body 100 relative to the vehicle 500 is determined by means of the image captured by the image acquisition device 200; if it is required to control the movement of a certain component of the support body 100, such as the movement of the cross beam assembly 30, the image acquisition device 200 may be mounted to the cross beam assembly 30 so that the position of the cross beam assembly 30 relative to the vehicle 50 can be determined by means of the image captured by the image acquisition device 200.

The cross beam assembly 30 is rotatable about the central axis of the stand assembly 20 such that the cross beam assembly 30 is perpendicular to a central plane of the vehicle 500. The trimming assembly 40 is mounted to the stand assembly 20, and the trimming assembly 40 is used for driving the cross beam assembly 30 to move left and right relative to the stand assembly 20 in a horizontal direction.

The moving distance of the cross beam assembly 30 in the vertical direction may be determined by the processing device 300, or the movement of the cross beam assembly 30 in the vertical direction may be driven by the control device 400. For example, the case that the processing device 300 may determine a distance that the cross beam assembly 30 needs to move in the vertical direction according to the image captured by the image acquisition device 200, and send a control instruction carrying the moving distance to the control device 400 so that the control device 400 controls the movement of the driving mechanism that drives the cross beam assembly 30 to move in the vertical direction, thereby driving the cross beam assembly 30 to move a specific distance in the vertical direction. For example, the case that the driving mechanism that drives the cross beam assembly 30 to move in the vertical direction may include: a gear transmission mechanism, lead screw transmission mechanism, etc.; or the processing device 300 may prompt the cross beam assembly 30 via a prompt module for a required moving distance, and the cross beam assembly 30 is manually moved by an operator according to the required moving distance. The prompt module may include a displayer, a sounder, etc.

The angle of rotation of the cross beam assembly 30 about the central axis of the stand assembly 20 is determined by the processing device 300 or the rotation of the cross beam assembly 30 about the central axis of the stand assembly 20 is driven by the control device 400. For example, the case that the processing device 300 may determine the required rotation angle of the cross beam assembly 30 relative to the central axis of the stand assembly 20 according to the image acquired by the image acquisition device 200, and then send a control instruction to the control device 400; the control device 400, according to the control instruction, controls the movement of the driving mechanism that drives the rotation of the cross beam assembly 30, so as to drive the rotation of the cross beam assembly 30 by a specific angle around the central axis of the stand assembly 20. For example, the case that the driving mechanism for driving the rotation of the cross beam assembly may comprise: a connecting-rod-type rotation mechanism, a crank-type rotation mechanism, etc.; or the processing device 300 may prompt the required rotation angle of the cross beam assembly 30 via a prompt module, and an operator controls the driving mechanism that drives the rotation of the cross beam assembly 30 to cause the cross beam assembly 30 to rotate a specific angle.

The moving distance of the cross beam assembly 30 in the horizontal direction may be determined by the processing device 300, or the movement of the cross beam assembly 30 in the horizontal direction is driven by the control device 400. For example, the case that the processing device 300 may determine a distance that the cross beam assembly 30 needs to move in the horizontal direction according to the image captured by the image acquisition device 200, and send a control instruction carrying the moving distance to the control device 400 so that the control device 400 controls the movement of the trimming assembly 40 that drives the cross beam assembly 30 to move in the horizontal direction, thereby driving the cross beam assembly 30 to move a specific distance in the horizontal direction. Or the processing device 300 may prompt the cross beam assembly 30 via a prompt module for a required moving distance, and the cross beam assembly 30 is manually moved by an operator according to the required moving distance. The prompt module may include a displayer, a sounder, etc.

Figure 4:
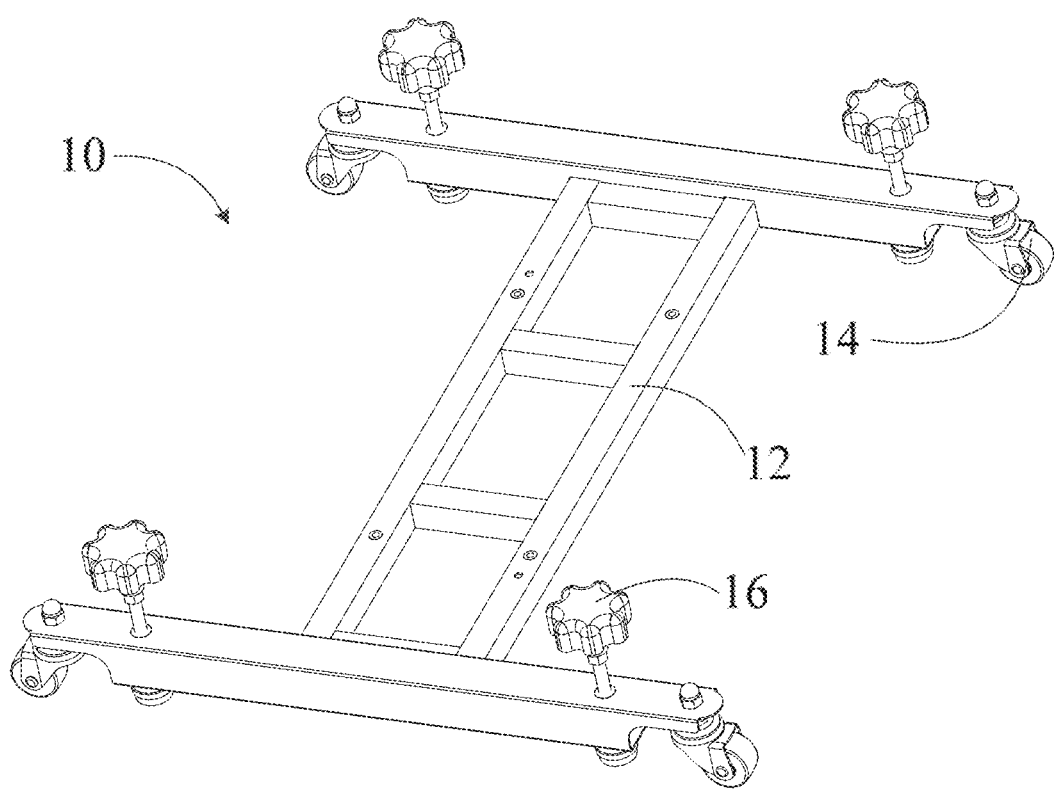
FIG. 4 is a schematic view showing a structure of a base in the support body shown in FIG. 3.

Referring to FIG. 4, the base 10 includes a base body 12, a roller 14, and a height adjustment member 16. The roller 14 is driven to roll by the control device 400 to drive the calibration support to move. For example, the case that after the processing device 300 calculates the movement position of the support body 100 relative to the vehicle 500, the control device drives the roller 14 to drive the support body 100 to move to this position.

It will be understood that in some embodiments the calibration support may also move under the action of the roller 14 by manually pushing the calibration support.

The base body 12 is generally "I"-shaped and symmetrically arranged, including one main body portion and two side portions extending from the main body portion to two sides. The base body 12 can be made of a metal material, the roller 14 is mounted to the bottom surfaces of the two side portions of the base body 12, the number of the rollers 14 can be four, and one roller 14 is mounted at the end of each side portion for facilitating the movement of the base body 12. In the present embodiment, the roller 14 is a universal moving roller so that the base body 12 can move back and forth, and left and right randomly.

The height adjustment member 16 is mounted to the base body 12 for adjusting the height of the base body 12. In the present embodiment, the height adjustment members 16 are adjusting knobs, the number of which is four. At least one section of a spiral rod is included below the knob, and the spiral rod is engaged with a threaded through hole at the base body 12 to enable height adjustment. Each of the height adjustment members 16 is mounted at two ends of each of the side portions and adjacent to one corresponding roller 14. In one implementation mode, the height adjustment member 16 can be adjusted so that the height adjustment member 16 is in contact with the ground and the roller 14 is jacked up, thereby, during the calibration process, preventing the base 10 from sliding under the driving of the roller 14.

It will be understood that in some other embodiments, the shape of the base body 12 may vary according to actual needs and is not limited to being "I" shaped. For example, the case that the base body 12 may be rectangular or triangular claw shaped. The number of the rollers 14 and the height adjustment members 16 may be respectively increased or decreased according to actual requirements. For example, the case that for a triangular-claw-shaped base body, three claws are included, respectively extending in three different directions. The number of the rollers may be three, each of the rollers being mounted to the end of one corresponding claw. The number of the height adjustment members is three, each of the height adjustment members being mounted to one corresponding claw and being close to one corresponding roller, and the three height adjustment members being in regular triangular distribution.

Figure 5:
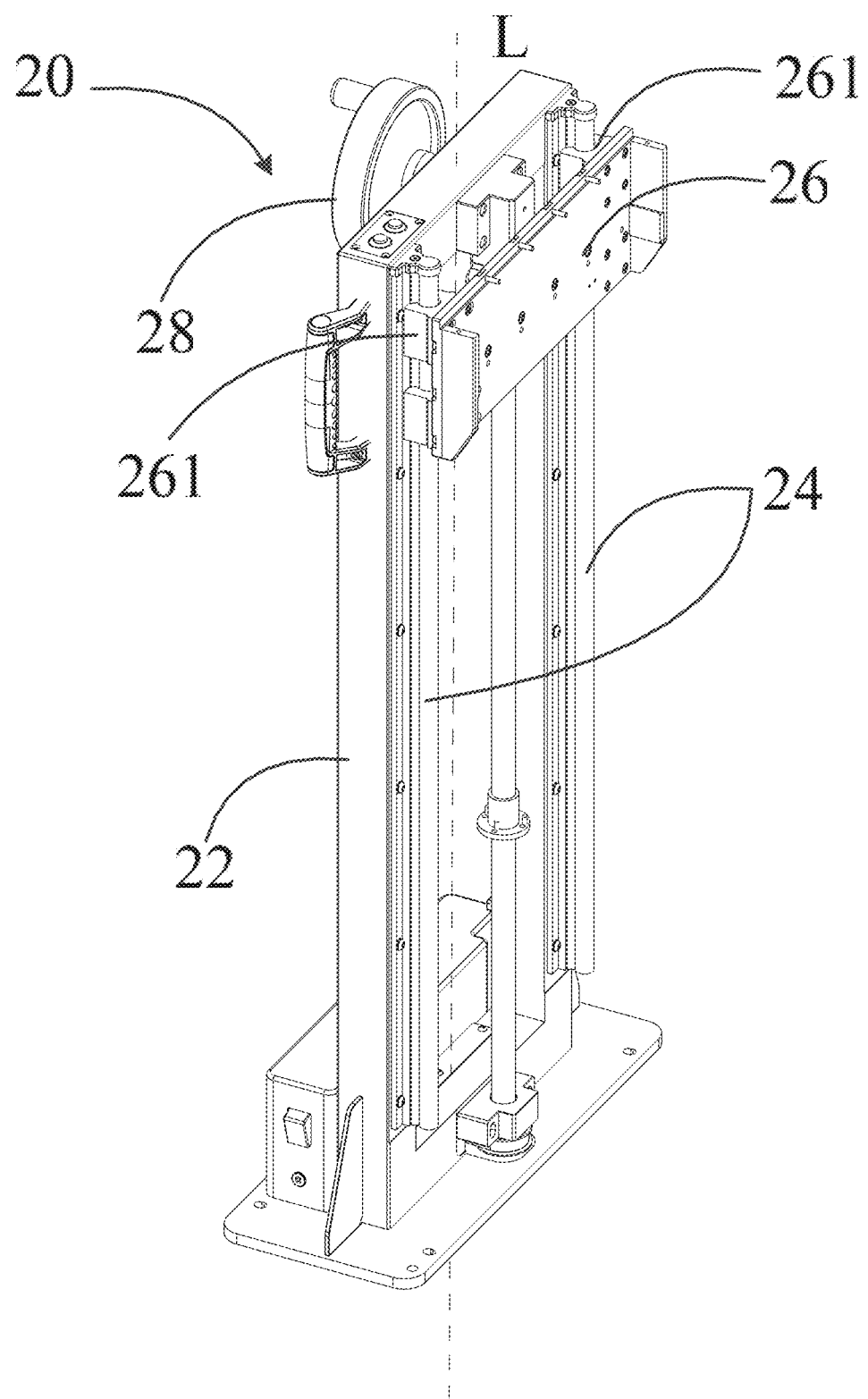
FIG. 5 is a schematic view showing a structure of a stand assembly in the support body shown in FIG. 3.
Figure 8:
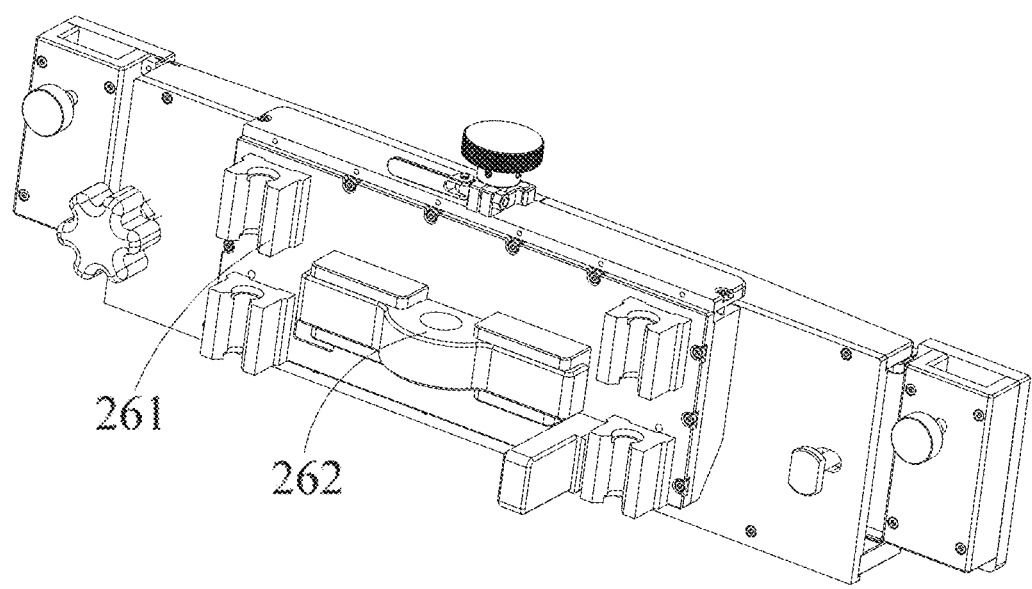
FIG. 8 is a schematic view showing a structure of a nut seat assembly in the support body shown in FIG. 3.

Referring to FIGS. 5 and 8 together, the stand assembly 20 comprises a stand body 22, a first sliding rail 24, a nut seat assembly 26, and a driving mechanism 28. The stand body 22 is of a symmetrical structure, the stand body 22 is vertically fixed to the base body 12, a central axis L of the stand body 22 is the central axis of the stand assembly 20, the first sliding rail 24 is fixed to a side face of the stand body 22, and the first sliding rail 24 extends from a top end of the stand body 22 to a bottom end of the stand body 22. In the present embodiment, the number of the first sliding rails 24 is two, and the first sliding rails 24 are provided at two ends on the same side of the stand body 22 respectively. The cross beam assembly 30 is mounted to the nut seat assembly 26, the nut seat assembly 26 is fixedly provided with a first sliding block 261 cooperating with the first sliding rail 24, and the first sliding block 261 cooperates with the first sliding rail 24 so that the nut seat assembly 26 can move along the length direction of the stand body 22. The driving mechanism 28 is mounted to the stand body 22 for driving the nut seat assembly 26 to move along the stand body 22 to move the cross beam assembly 30 in a vertical direction relative to the stand body 22.

In one implementation mode, limiting devices are respectively provided at two ends of the first sliding rail 24 to prevent the nut mounting seat 26 from sliding out of the stand body 22.

Figure 6:
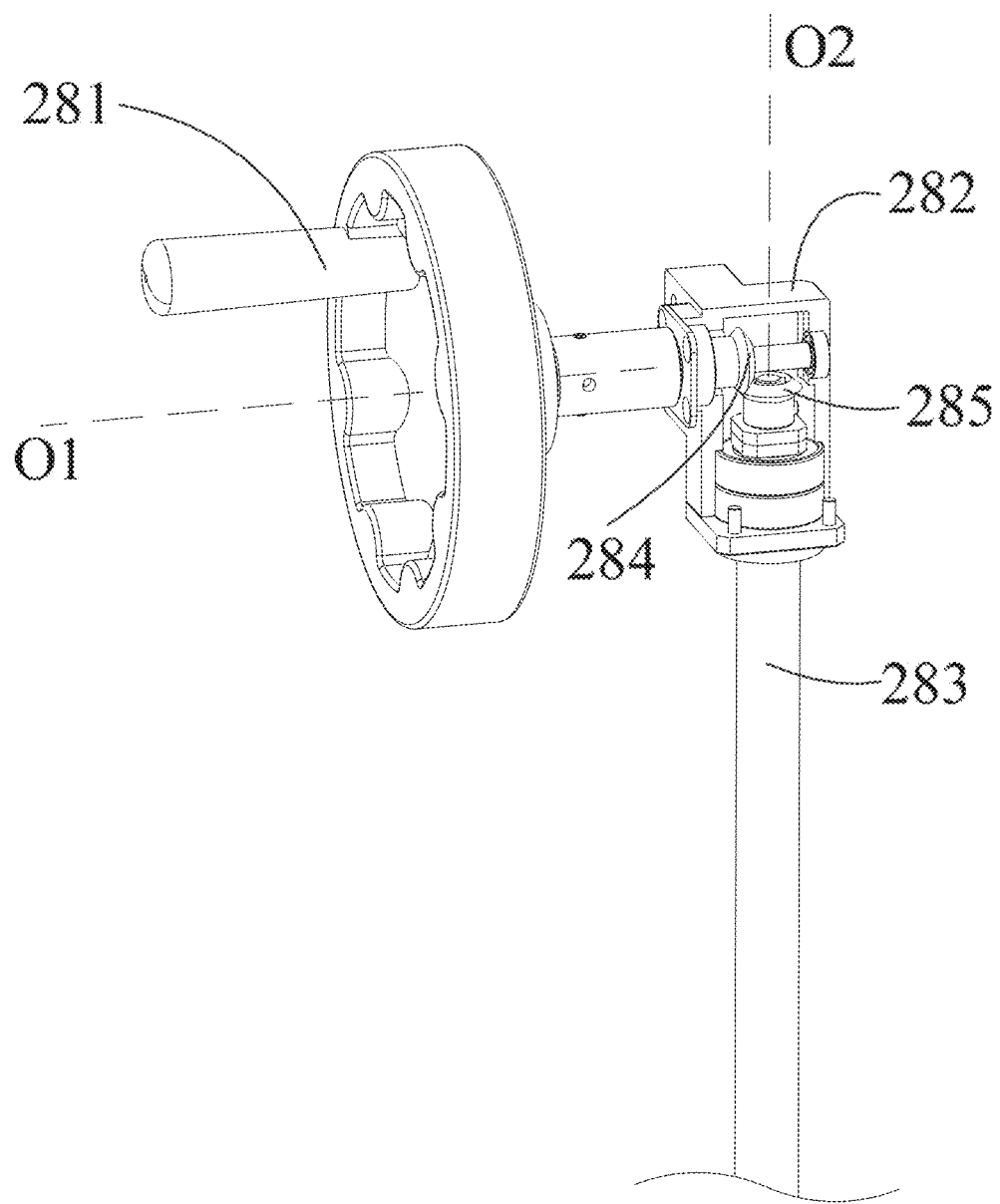
FIG. 6 is a schematic view of an upper portion structure of a driving mechanism in the stand assembly shown in FIG. 5.
Figure 7:
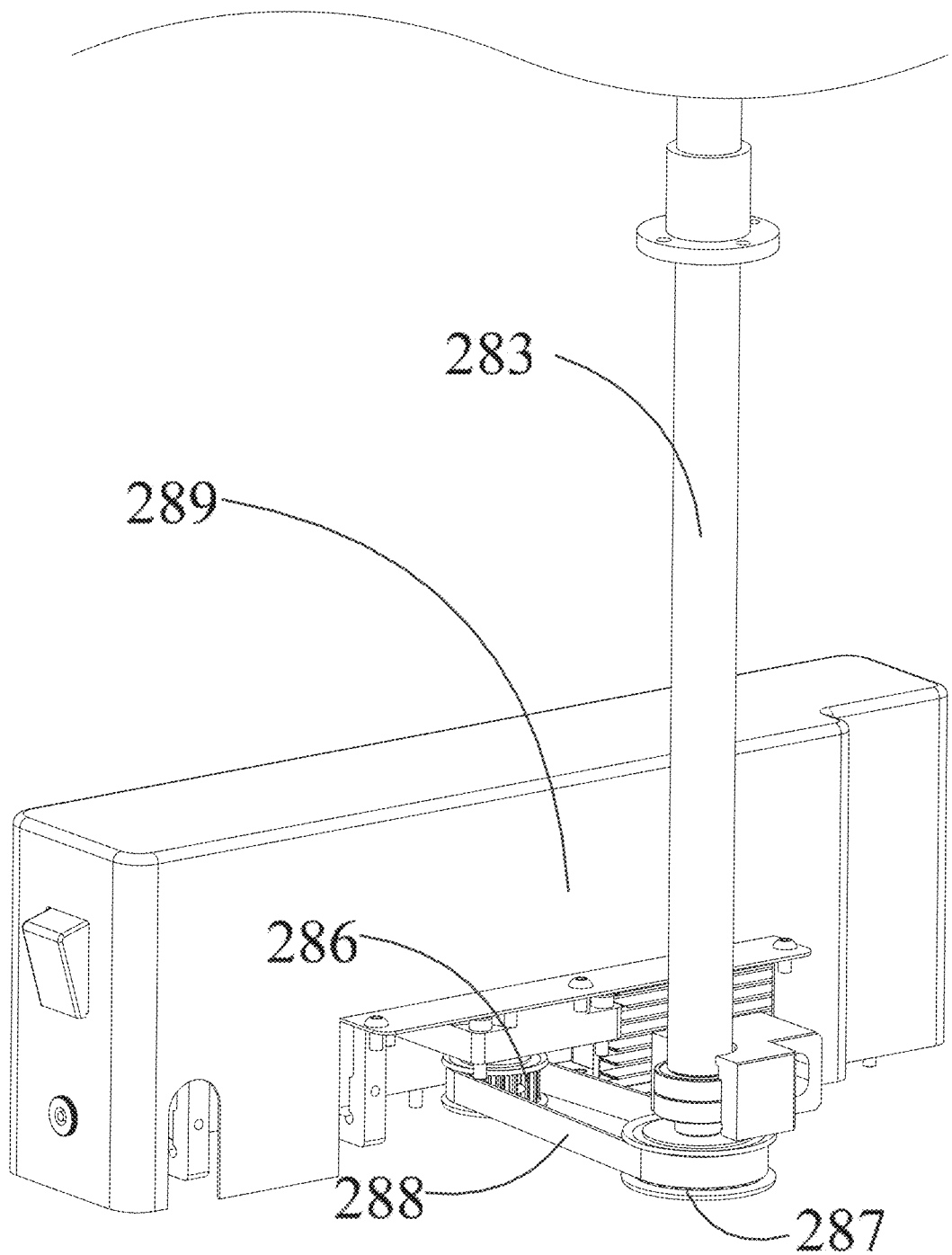
FIG. 7 is a schematic view of an upper portion structure of a driving mechanism in the stand assembly shown in FIG. 5.

Referring to FIGS. 6 and 7 together, the driving mechanism 28 includes a handwheel 281, a housing 282, a lead screw 283, and a gear transmission assembly.

The gear transmission assembly includes a first helical gear 284, a second helical gear 285, a first transmission gear 286, a second transmission gear 287, a synchronous belt 288, and a motor assembly.

The housing 282 is fixedly mounted to the upper end of the stand body 22, and the motor assembly is mounted to the lower end of the stand body 22.

The handwheel 281 is mounted to the housing 281, the handwheel 281 being rotatable about a first rotation axis O1.

The gear transmission assembly can make the position movement of the nut seat assembly 26 more precise and labor-saving. In the gear transmission assembly, the first helical gear 284 is located in the housing 281 and fixedly mounted to the handwheel 281. The rotation axis of the first helical gear 284 coincides with the rotation axis of the handwheel 281, and the first helical gear 284 and the handwheel 281 are rotatable together about the first rotation axis O1.

The second helical gear 285 is located in the housing 281, fixedly mounted to the top end of the lead screw 283, and rotatable about a second rotation axis O2. The central axis L of the stand body is parallel to the second rotation axis O2. The first helical gear 284 meshes with the second helical gear 285.

The rotation axis of the lead screw 283 coincides with the rotation axis of the second helical gear 285, and the first rotation axis O1 is perpendicular to the second rotation axis O2.

When the handwheel 281 rotates about the first rotation axis O1, the first helical gear 284 is driven to rotate about the first rotation axis O1, and the second helical gear 285 and the lead screw 283 rotate about the second rotation axis O2.

The motor assembly comprises a motor 289, and the first transmission gear 286 is mounted in the motor assembly. The first transmission gear 286 is connected to an output shaft of the motor 289, the second transmission gear 287 is fixedly mounted to the bottom end of the lead screw 283, and the first transmission gear 286 and the second transmission gear 287 are transmitted via a synchronous belt 288.

The rotation axis of the second transmission gear 287 coincides with the rotation axis of the lead screw 283. When the motor 289 drives the first transmission gear 286 to rotate, the second transmission gear 287 and the lead screw 283 rotate around the second rotation axis O2 under the action of the synchronous belt 288.

Figure 9:
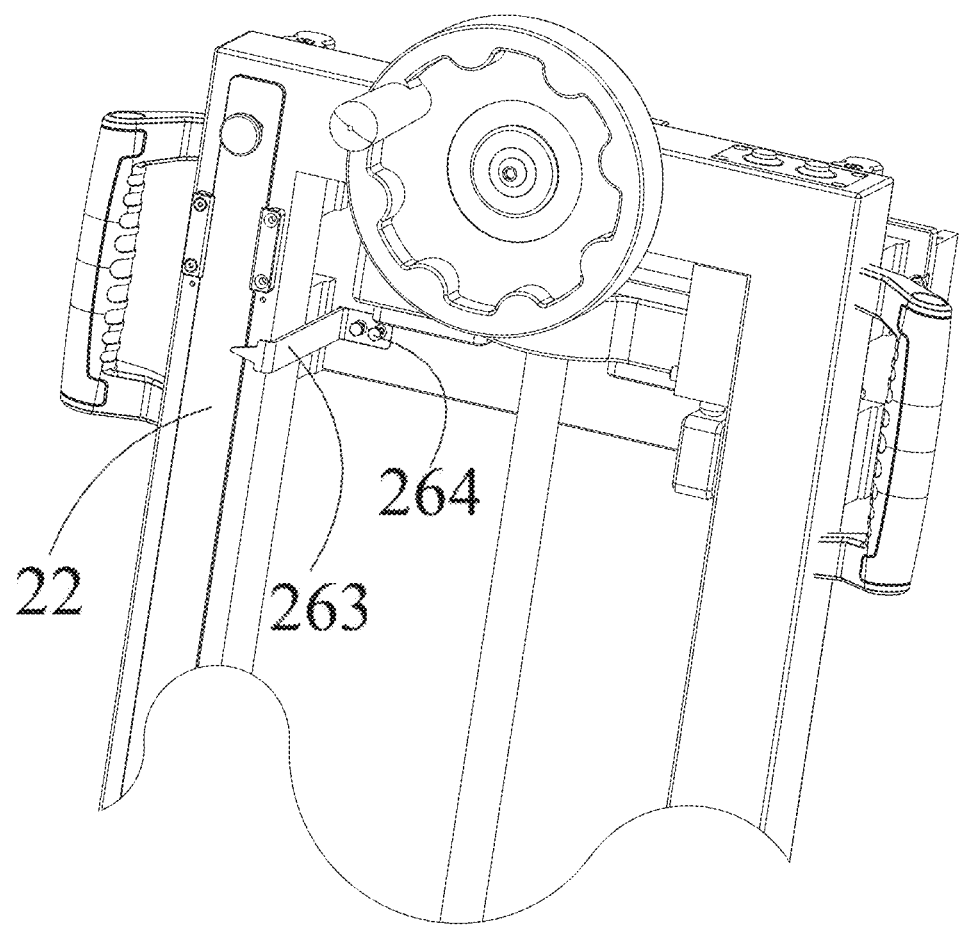
FIG. 9 is a schematic view of a structure of a fastening assembly on the nut seat assembly shown in FIG. 8.

Referring to FIGS. 8 and 9 together, the nut seat assembly 26 is fixedly provided with a nut 262 cooperating with the lead screw 283. Specifically, the lead screw 283 is threadedly connected to the nut 262, and when the lead screw 283 rotates, the nut 262 can rise or fall along the lead screw 283, namely; when the lead screw 283 rotates, the nut seat assembly 26 is driven to rise or fall along the length direction of the lead screw 283, so that the cross beam assembly 30 rises or falls relative to the stand body 22 along the vertical direction.

The rotation of the motor 289 may be driven by the control device 400. For example, the case that the control device 400 drives the motor 289 to rotate, thereby driving the lead screw 283 to rotate so as to move the cross beam assembly 30 in the vertical direction.

It will be understood that the cross beam assembly 30 can also be moved up and down in the vertical direction by manually rotating the handwheel 281.

In some embodiments, the nut seat assembly 26 further includes a fastening assembly for fixing the nut seat assembly 26 to the stand body 22. The fastening assembly may include a fastener 263 and a bolt 264, the fastener 263 being in the shape of a "Z" having one end hooking the stand body 22 and another end fixed to the nut seat assembly 26 by the bolt 264.

When the nut seat assembly 26 is required to move up and down relative to the stand body 22 along the vertical direction, the bolt 264 is loosened; when the nut seat assembly 26 moves to a required position, the bolt 264 is tightened so that the nut seat assembly 26 is fixed in the required position.

Figure 10:
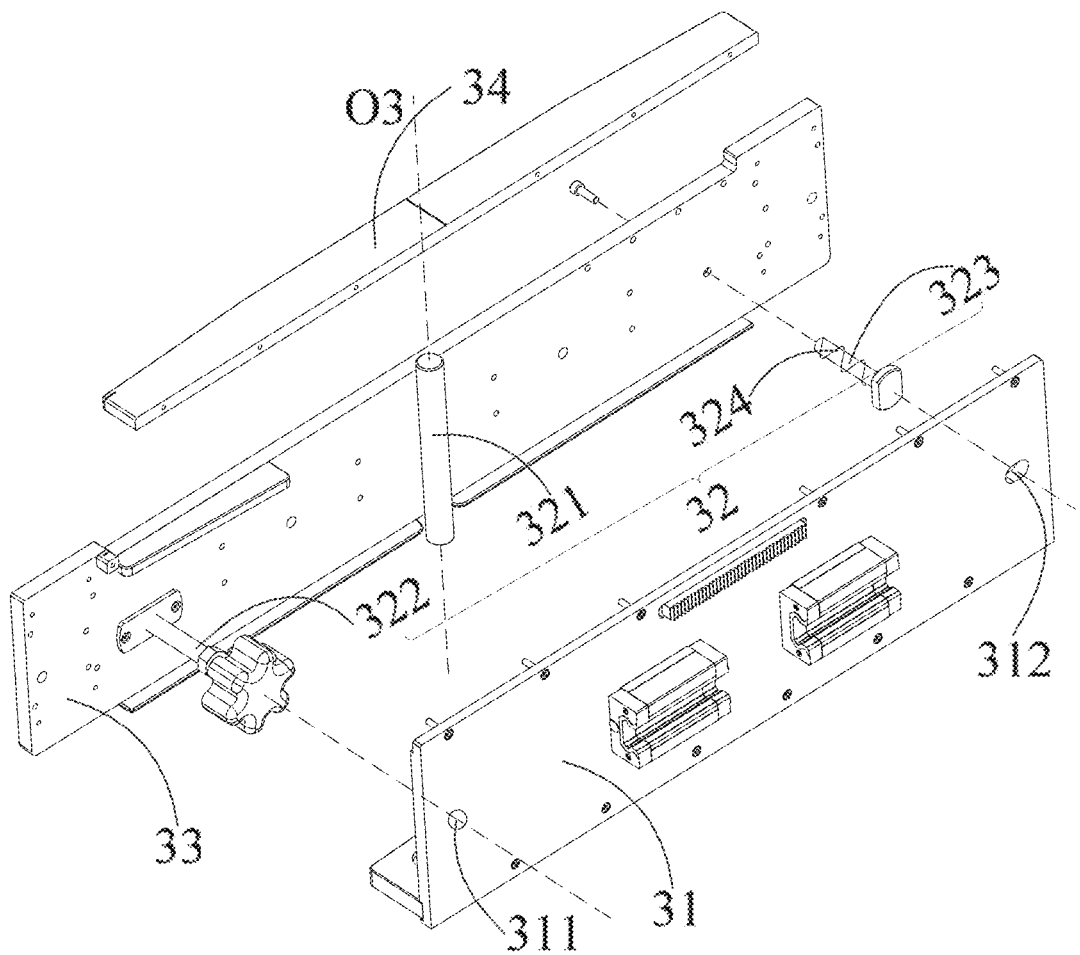
FIG. 10 is an exploded schematic view of a cross beam assembly in the support body shown in FIG. 3.
Figure 11:
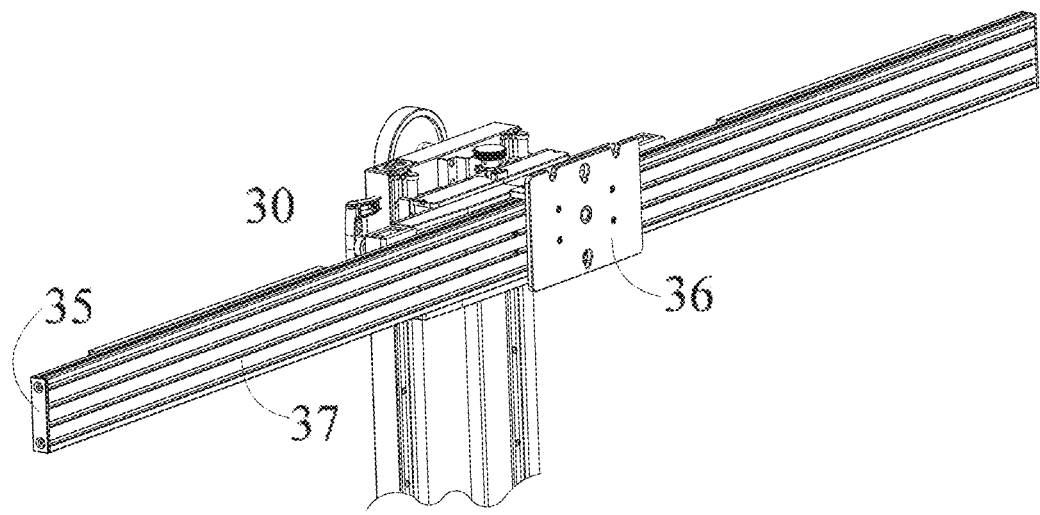
FIG. 11 is a schematic view showing a structure of a cross beam assembly in the support body shown in FIG. 3.

Referring to FIGS. 10 and 11 together, the cross beam assembly 30 includes a mounting seat 31, a rotation mechanism 32, a cross beam mounting plate 33, and a cover plate 34. The rotation mechanism 32 can adjust the rotation of the cross beam mounting plate 33 relative to the rotation axis of the lead screw 283; the cross beam mounting plate 33 is used to fix the cross beam 35, the cross beam mounting plate 33 is mounted between the mounting seat 31 and the cover plate 34, the cover plate 34 is fixed to the upper end of the mounting seat 31, and the cover plate 34 is pressed and provided to the top end of the cross beam mounting plate 33.

The rotation mechanism 32 includes a rotation axis 321 fixed to the middle of the cross beam mounting plate 33 and connected between the mounting seat 31 and the cover plate 34, a first bolt 322, a second bolt 323, and an elastic member 324, the first bolt 322 and the second bolt 323 being respectively provided at two sides of the rotation axis 321.

The rotation axis O3 of the rotation axis 321 is parallel to the central axis L of the stand assembly 20, the cover plate 34 and the mounting seat 31 are both provided with a hole cooperating with the rotation axis 321, and the hole cooperating the rotation axis 321 on the cover plate 34 is a blind hole.

The first bolt 322 is sleeved with a nut, and the nut is in threaded connection with the first bolt 322.

A first through hole 311 through which the first bolt 322 passes is provided on the mounting seat 31, the first bolt 322 passes through the first through hole 311, one end of the first bolt 322 being in threaded connection with the cross beam mounting plate 33, and the other end, together with a nut sleeved on the first bolt 322, being exposed to a preset distance from the mounting seat 31.

The elastic member 324 is sleeved on the second bolt 323, and the elastic member 324 is connected between the mounting seat 31 and the cross beam mounting plate 33. A second through hole 312 through which the second bolt 323 passes is provided on the mounting seat 31, and the second bolt 323 passes through the second through hole 312, one end of the second bolt 323 being fixed to the cross beam mounting plate 33, and the other end being exposed at a certain distance from the mounting seat 31.

In this embodiment, the elastic body 28 is a spring. It could be understood that in some other embodiments, the elastic body 28 may be other elastic elements, such as an elastic sheet, etc.

When it is required to rotate the cross beam mounting plate 33 relative to the rotation axis 321, the first bolt 322 is rotated; when the first bolt 322 is in right-handed rotation, the elastic member 324 is in a stretched state, and the cross beam mounting plate 33 can rotate counterclockwise within a certain range around the rotation axis 321; when the first bolt 322 is in left-handed rotation, the elastic member 324 is in a compressed state, and the cross beam mounting plate 33 can rotate clockwise within a certain range about the rotation axis 321.

That is, by adjusting the first bolt 322, the cross beam 35 can be rotated within a certain range about the central axis L of the stand assembly 20.

The rotation of the first bolt 322 may be driven by the control device 400. For example, the case that the control device 400 drives the first bolt 322 to rotate so that the cross beam 35 rotates about the central axis L of the stand assembly 20 such that the cross beam 35 is perpendicular to the central plane of the vehicle.

It will be understood that the cross beam 35 may also be rotated about the central axis L of the stand assembly 20 by manually rotating the first bolt 322.

In some embodiments, referring to FIG. 11, the cross beam assembly 30 further includes a second sliding block 36 and a second guide rail 37. The second guide rail 37 is provided parallel to the cross beam 35, the second sliding block 36 is mounted to the second guide rail 37, and the second sliding block 36 is movable in the horizontal direction along the second guide rail 37. The second sliding block 36 is used to mount one of the image acquisition device 200 and the calibration element.

The moving distance of the second sliding block 36 in the horizontal direction along the second guide rail 37 is determined by the processing device 300, or the movement of the second sliding block 36 in the horizontal direction along the second guide rail 37 is driven by the control device 400. For example, the case that after the vehicle 500 moves to a specified position, the image acquisition device 200 acquires an image of the vehicle 500; the processing device 300 calculates the position of the image acquisition device 200 relative to the vehicle 500 based on the image acquired by the image acquisition device 200; the processing device 300 determines the distance that the image acquisition device 200 needs to move according to the distance of the image acquisition device 200 relative to the vehicle 500 and the preset distance of the image acquisition device 200 relative to the vehicle, and then the control device drives the sliding block to move the distance.

It will be understood that in some embodiments, the image acquisition device 200 or the calibration element may also slide along the second guide rail by hand acting on the image acquisition device 200 or the calibration element.

Figure 12:
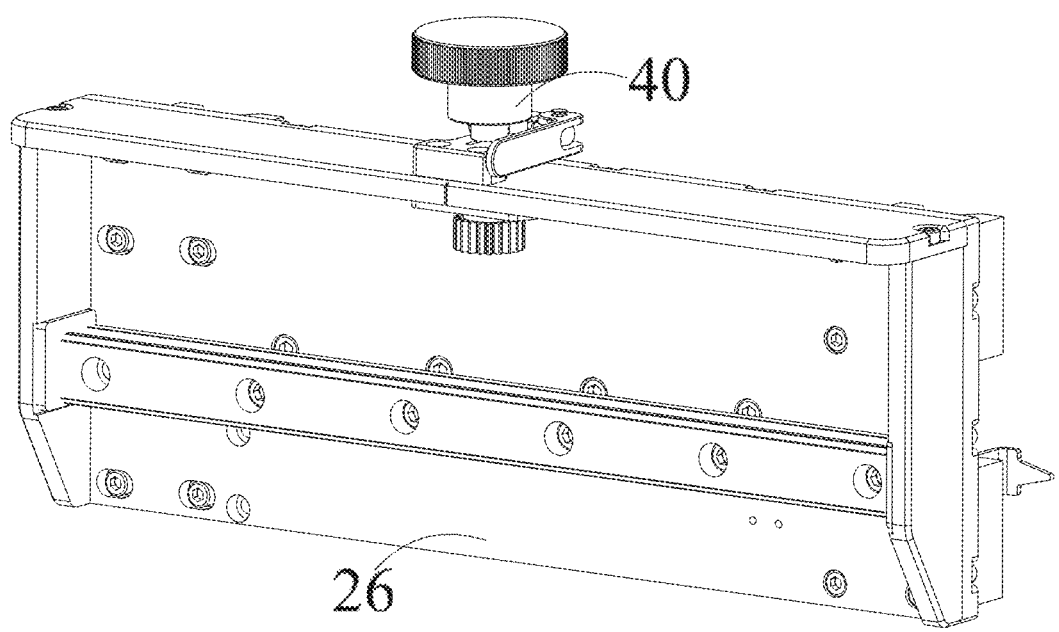
FIG. 12 is a schematic view showing a structure of a trimming assembly in the support body shown in FIG. 3.
Figure 13:
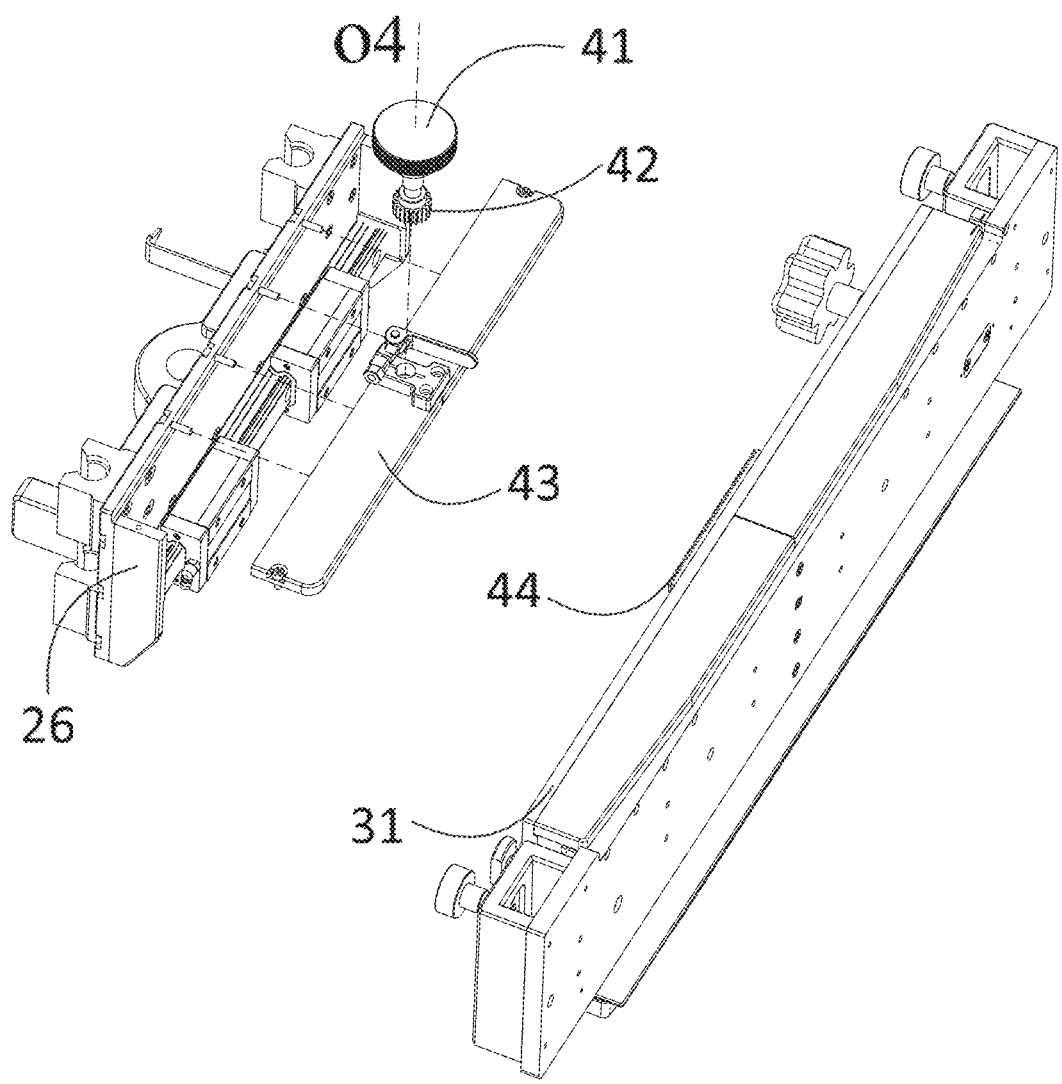
FIG. 13 is a schematic view showing the mounting of a trimming assembly.

Referring to FIGS. 12 and 13 together, the trimming assembly 40 is mounted to the nut mounting seat 26, the trimming assembly 40 including a knob 41, a third transmission gear 42, a fixing plate 43, and a rack 44, and the trimming assembly 40 being fixed to the nut mounting seat 26 by the fixing plate 43.

The knob 41 is mounted to the fixing plate 43, the third transmission gear 42 is fixedly mounted to the bottom end of the knob 41, the fixing plate 43 is located between the knob 41 and the third transmission gear 42, and the fixing plate 43 is pressed on the upper end of the mounting seat 31. The rack 44 is fixed to the mounting seat 31, and the third transmission gear 42 meshes with the rack 44.

The knob 41 is rotatable about a fourth rotation axis O4, the rotation axis of the third transmission gear 42 coincides with the rotation axis of the knob 41, and the knob 41 and the third transmission gear 42 can rotate together about the fourth rotation axis O4.

When the knob 41 is rotated, the mounting seat 31 can move left and right within a certain range relative to the nut mounting seat 26.

The rotation of the knob 41 may be driven by the control device 400. It will be understood that the cross beam assembly 30 can also move left and right by manually rotating the knob 41.

Figure 14:
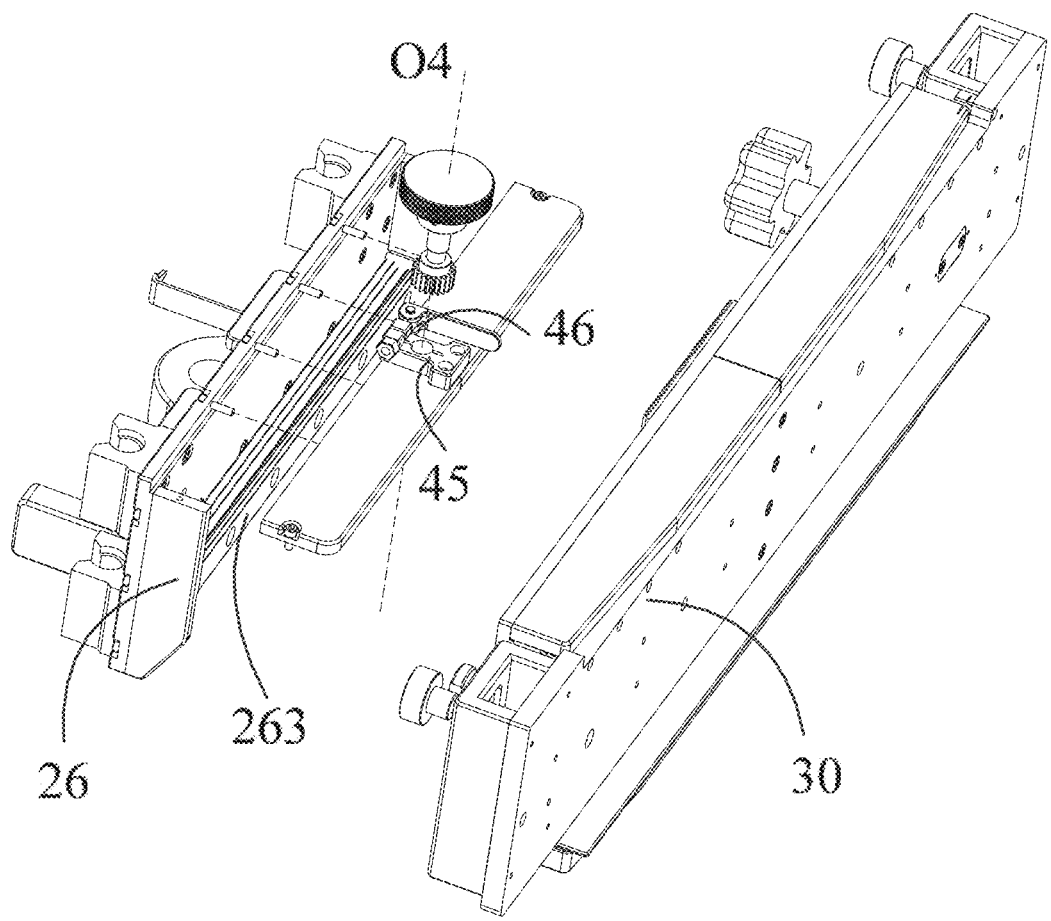
FIG. 14 is a schematic view showing the mounting of a trimming assembly with a nut seat assembly.
Figure 15:
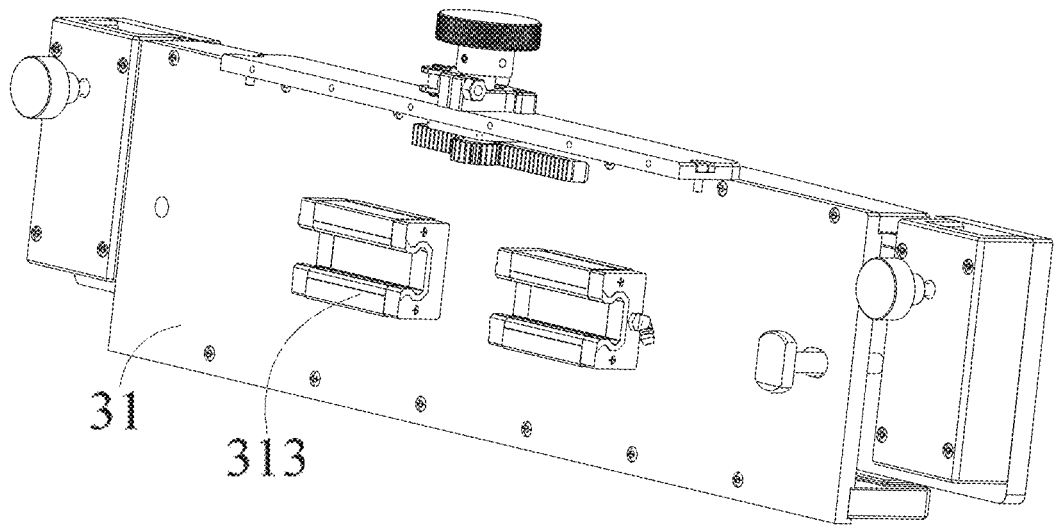
FIG. 15 is a schematic view showing the mounting of a trimming assembly and a cross beam assembly.

Referring to FIGS. 14 and 15 together, in some embodiments, a third sliding rail 263 is provided on the nut mounting seat 26 for stabilizing the mounting seat 31 in left and right movement, and a third sliding block 313 is fixedly provided on the mounting seat 31 for cooperating with the third sliding rail 263.

The cross beam assembly 30 is connected to the nut seat assembly 26 by the cooperation of the sliding block 313 on the mounting seat 31 with the third sliding rail 263.

Optionally, the trimming assembly 40 further includes a fastening mechanism (not shown) for fixing the mounting seat 31 to the nut seat assembly 26. The fastening mechanism is mounted to the fixing plate 43, and comprises a fastening ring 45 sleeved on the knob 41 and a fastening bolt 46 mounted to two ends of the fastening ring 45.

When it is required to move the cross beam assembly 30 left and right relative to the nut seat assembly 26, the fastening bolt 46 is rotated so that the fastening ring 45 releases the knob 41. The knob 41 is rotated so that the cross beam assembly 30 can move left and right in a horizontal direction relative to the nut seat assembly 26. When the required position is reached, the fastening bolt 46 is rotated to fasten the knob 41 so that the cross beam assembly 30 is fixed at the required position.

The loosening or tightening of the fastening bolt 46 may be driven by the control device 400. It will be understood that the cross beam assembly 30 may also move left and right by manually unscrewing or screwing the fastening bolt 46.

For example, the case that the control device 400 controls the fastening bolt 46 to unscrew so that the fastening ring 45 releases the knob 41, and the control device 400 drives the knob 41 to rotate so that the cross beam assembly 30 can move left and right relative to the nut seat assembly 26 in the horizontal direction. When the required position is reached, the control device 400 controls the fastening bolt 46 to screw so that the fastening ring 45 locks the knob 41, thereby fixing the cross beam assembly 30 in the required position.

The embodiments of the present application illustrate the application process of the above-mentioned support by examples:

firstly, the processing device 300 calculates the movement position of the support body relative to the vehicle according to the image acquired by the image acquisition device, and outputs a control signal including the movement position such that the control device controls the support body to move based on the control signal such that the calibration support moves to a position where the vehicle is calibrated. Then, the processing device 300 determines the vehicle height of the vehicle or the height of the equipment to be calibrated on the vehicle based on the image of the vehicle acquired by the image acquisition device 200; determines the height required to be placed of the calibration element when calibrating the vehicle according to the vehicle height of the vehicle or the height of the equipment to be calibrated; and then, according to the height of the cross beam assembly 30 relative to the support body 100 and the height required to be placed of the calibration element, determines the distance that the cross beam assembly 30 needs to move along the vertical direction. Then the control device 400 drives the cross beam assembly 30 to move the required distance along the vertical direction. Alternatively, if the image acquisition device 200 is mounted to the cross beam assembly 30, the processing device 300 may, via the image captured in real time by the image acquisition device 200, determine whether the cross beam assembly 30 moves to the required height. If the required height is not reached, the moving distance of the cross beam assembly 30 may be further adjusted until the cross beam assembly 30 reaches the required height. Then, the processing device 300 can, according to the images acquired by the image acquisition device 200, calculate the angle of the cross beam assembly 30 relative to the vehicle central plane, i.e. the angle of the image acquisition device 200 relative to the vehicle central plane. The vehicle central plane refers to the plane that contains the thrust line of the vehicle or the plane of the vehicle central line perpendicular to the ground on which the vehicle is supported. The thrust line of the vehicle or the central line of the vehicle is a straight line formed by connecting the center point between the centers of the two rear wheels of the vehicle with the center point between the centers of the two front wheels of the vehicle. In order to make the cross beam assembly 30 perpendicular to the central plane of the vehicle, the processing device 300 calculates the required rotation angle of the cross beam assembly 30 about the central axis of the stand assembly 20, and sends an instruction containing the required rotation angle to the control device 400. The control device 400 in turn drives the cross beam assembly 30 to rotate about the central axis of the stand assembly 20 so that the cross beam assembly 30 directly faces the vehicle, that is, it is allowed that the cross beam assembly 30 is perpendicular to the central plane of the vehicle. Alternatively, if the image acquisition device 200 is mounted to the cross beam assembly 30, for example, the case that the cross beam assembly 30 comprises a horizontally arranged guide rail and a sliding block, the sliding block can move in the horizontal direction of the guide rail, the image acquisition device can be mounted to the guide rail, and the image acquisition device 200 can be aligned with the equipment to be calibrated on the vehicle by horizontally moving the position of the image acquisition device 200 along the cross beam assembly 30. The processing device 300 can determine whether the image acquisition device 200 is aligned with the equipment to be calibrated on the vehicle by the image acquired by the image acquisition device 200. The position of the image acquisition device 200 represents the mounting position of the calibration element on the support body 100, for example, the case that the above-mentioned image acquisition device 200 is mounted to the second sliding block 36 (see FIG. 11); after determining the position, the image acquisition device 200 can be unloaded from the sliding block 36, and the calibration element is mounted to the sliding block 36, so as to complete the positioning of the calibration element, and finally, calibration is performed via the calibration element provided on the cross beam assembly 30. The image acquisition device 200 moves in the horizontal direction relative to the cross beam assembly 30, and may be driven by the control device 400. Or the processing device 300 prompts an operator to move the image acquisition device 200 via a prompt device, such as a displayer, etc.

Figure 16:
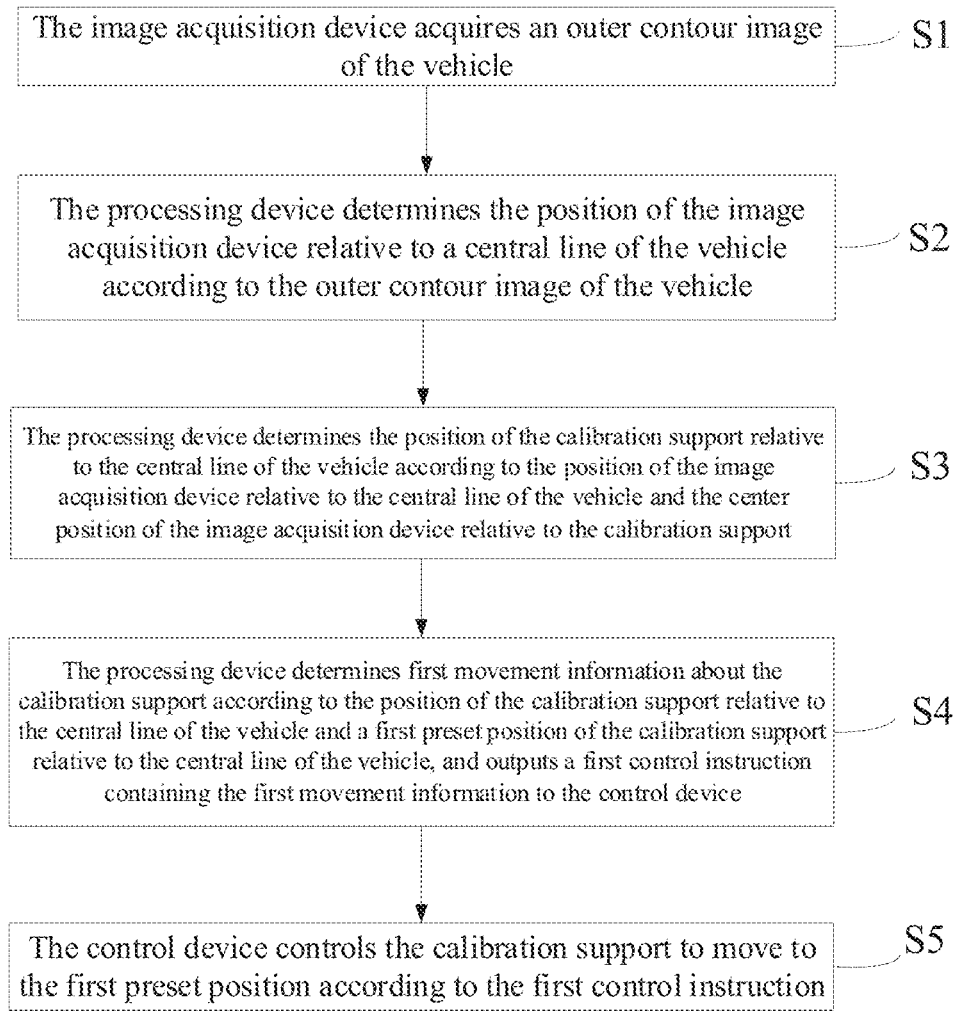
FIG. 16 is a positioning method for a calibration element provided by the present invention.

With reference to FIG. 16, an embodiment of the present invention also provides a positioning method for a calibration element to be used on the calibration support described above. The method includes steps as follows:

step S1, the image acquisition device 200 acquires an outer contour image of the vehicle;

the outer contour image referring to an image outlined by an edge line that defines a form range of a representation object (i.e. a vehicle);

step S2, the processing device 300 determines the position of the image acquisition device 200 relative to the central line of the vehicle according to the outer contour image of the vehicle;

wherein the central line of the vehicle refers to a straight line formed by connecting a center point between the centers of two rear wheels of the vehicle and a center point between the centers of two front wheels of the vehicle, and the central line of the vehicle is obtained by means of image identification.

step S3, the processing device 300 determines the position of the calibration support relative to the central line of the vehicle according to the position of the image acquisition device 200 relative to the central line of the vehicle 500 and the center position of the image acquisition device 200 relative to the calibration support; it needs to be noted that, in step S3, since the image acquisition device 200 is connected to the support body 100, the current center position of the image acquisition device 200 relative to the calibration support can be predetermined;

step S4, the processing device 300 determines the first movement information about the calibration support according to the position of the calibration support relative to the central line of the vehicle 500 and a first preset position of the calibration support relative to the central line of the vehicle, and outputs a first control instruction including the first movement information to the control device 400;

wherein it needs to be noted that in step S4, the first preset position refers to a position for calibration of the vehicle, for example: a position aligned with the central line of the vehicle and located 500 meters directly in front of the vehicle; furthermore, the first movement information refers to information required for the calibration support to move when the calibration support moves to a first preset position, in other words, after the calibration support moves according to the first movement information, the calibration support will move to the first preset position;

step S5, the control device 400 controls the calibration support to move to the first preset position according to the first control instruction.

In an embodiment of the invention, the central line of the vehicle is determined according to the outer contour image of the vehicle; the first movement information about the calibration support is determined according to the position of the central line of the vehicle relative to the image acquisition device, and the position of the calibration support relative to the image acquisition device, and the first preset position; the calibration support is moved according to the first movement information so that the calibration support automatically moves to the position for calibrating the vehicle without requiring manual movement of the calibration support by a user, thereby reducing the complexity of the operation and improving the working efficiency.

After the calibration support moves to the first preset position, a calibration element can be mounted to the calibration support. The equipment to be calibrated in the driving system on the vehicle is calibrated by the calibration element.

Vehicle driving systems can be divided into adaptive cruise system, night vision system, blind spot system, vehicle deviation warning system, etc. according to different functions. The adaptive cruise system mainly comprises radar. The radar of the adaptive cruise system may be single radar, which is generally arranged in the middle of the head of the vehicle, or double radar, which is generally arranged on two sides of the head of the vehicle. The radar in the adaptive cruise system can be calibrated through the calibration element of the adaptive cruise system. The calibration element of the adaptive cruise system may be a radar calibration plate (for reflecting the waves emitted by the radar), a radar calibration box, a corner reflector, and like radar calibration members. The night vision system is mainly arranged at the position where the head of the vehicle deviates from the midpoint, and the night vision system can be adjusted by a night vision system calibrator, and the night vision system calibrator 102*c* can be an infrared emission device such as infrared radar, for example, an infrared radar, etc. The blind spot system mainly comprises radar, the radar of the blind spot system is generally arranged at the rear of the vehicle, and the blind spot system can be calibrated via the calibration element of a blind spot detection system. The calibration element of the blind spot detection system can be a Doppler generator, namely, a blind spot box, a radar calibration box, etc. The vehicle deviation warning system mainly comprises a camera on a vehicle window of the vehicle, and the vehicle deviation warning system can be calibrated via a pattern plate.

Figure 17:
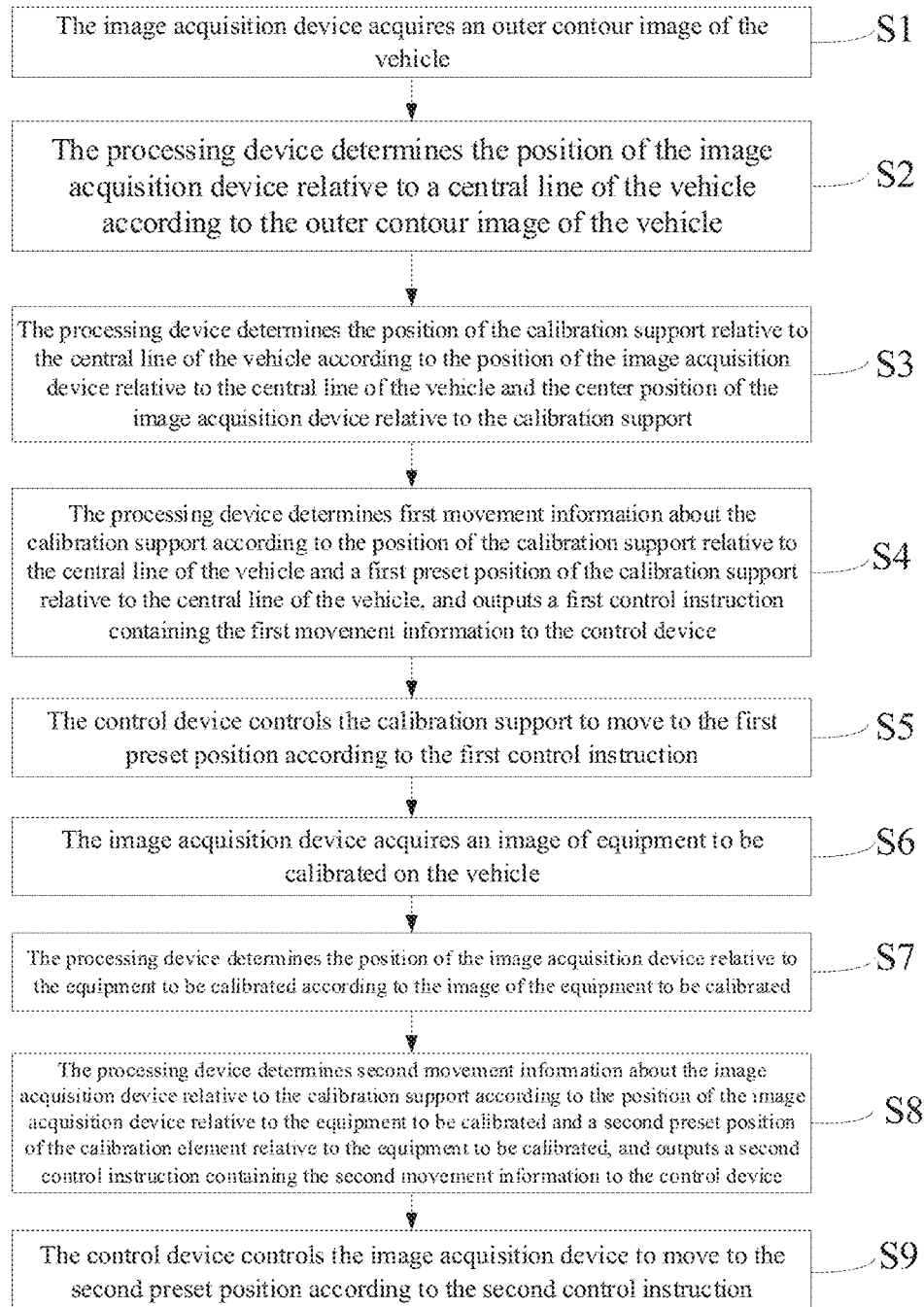
FIG. 17 is a positioning method for a calibration element provided by yet another embodiment of the present invention.

Please refer to FIG. 17, a second implementation mode of a positioning method for a calibration element according to an embodiment of the present invention. The embodiment differs from the above embodiment in that the method further includes steps as follows:

step S6: the image acquisition device 200 acquires an image of equipment to be calibrated on the vehicle;

wherein it needs to be noted that the equipment to be calibrated may be a sensor of the adaptive cruise system, for example: sensors of the night vision system, a sensor of the blind spot system, a sensor of the vehicle deviation warning system, etc. while the positions of the equipment to be calibrated of different systems on the vehicle are different, for example: cases that the sensor of the blind spot system is typically at the rear of the vehicle, the sensor of the night vision system is typically at a position where the head of the vehicle deviates from the midpoint, and the sensor of the adaptive cruise system is typically on two sides of the head of the vehicle;

step S7: the processing device 300 determines the position of the image acquisition device 200 relative to the equipment to be calibrated according to the image of the equipment to be calibrated;

step S8: the processing device 300 determines the second movement information of the image acquisition device 200 relative to the calibration support according to the position of the image acquisition device 200 relative to the equipment to be calibrated and a second preset position of the calibration element relative to the equipment to be calibrated, and outputs a second control instruction containing the second movement information to the control device 400;

wherein it needs to be noted that in step S8, the second preset position is a calibration position of the calibration element relative to the equipment to be calibrated, for example: a position 500 meters in front of the equipment to be calibrated; furthermore, the second movement information refers to information required for the image acquisition device 200 to move when the image acquisition device 200 moves to the second preset position, in other words, after the image acquisition device 200 moves according to the second movement information, the image acquisition device 200 will move to the second preset position;

step S9: the control device 400 controls the image acquisition device 200 to move to the second preset position according to the second control instruction;

wherein after the image acquisition device 200 moves to the second preset position, the image acquisition device 200 is unloaded, a calibration element is mounted to the second preset position, and the calibration element calibrates the vehicle.

In the embodiment of the present invention, the position of the image acquisition device relative to the equipment to be calibrated is determined according to the image of the equipment to be calibrated; then the second movement information about the image acquisition device is determined according to the position of the calibration element relative to the image acquisition device and the second preset position; the image acquisition device is moved according to the second movement information so that the image acquisition device automatically moves to the position used for calibrating the equipment to be calibrated without requiring the user to manually move the image acquisition device, thereby improving the accuracy and reliability of calibration.

Finally, it should be noted that: the above embodiments are merely illustrative of the technical solutions of the present invention, rather than limiting thereto; combinations of technical features in the above embodiments or in different embodiments are also possible within the idea of the present invention, and the steps can be implemented in any order, and there are many other variations of the different aspects of the present invention as described above, which are not provided in detail for the sake of brevity; although the present invention has been described in detail with reference to the foregoing embodiments, those of ordinary skills in the art will appreciate that: the technical solutions disclosed in the above-mentioned embodiments can still be modified, or some of the technical features can be replaced by equivalents; such modifications and substitutions do not depart the essence of corresponding technical solutions from the scope of the technical solutions of various embodiments of the present invention.

The invention claimed is:

1. A calibration support comprising:
   a support body, comprising a cross beam assembly, the cross beam assembly configured for mounting a calibration element thereon, and the calibration element being used for calibrating a driving assistance system of a vehicle;
   an image acquisition device connected to the support body for acquiring an image of the vehicle, the cross beam assembly comprising a sliding block and a horizontal guide rail, the sliding block being mounted to the horizontal guide rail, and the sliding block being movable in a horizontal direction along the horizontal guide rail, wherein the sliding block is used for mounting one of the image acquisition device and the calibration element thereon;
   a processing device provided on the support body and electrically connected to the image acquisition device, the processing device being configured for calculating a movement position of the support body relative to the vehicle according to the image acquired by the image acquisition device, and outputting a control signal containing the movement position; the processing device being further configured for calculating the position of the image acquisition device relative to the vehicle based on the image acquired by the image acquisition device, determining the distance that the image acquisition device needs to move according to the distance of the image acquisition device relative to the vehicle and the preset distance of the image acquisition device relative to the vehicle, and outputting a control signal that includes the distance that the image acquisition device needs to move; and
   a control device provided on the support body and electrically connected to the processing device, the control device being configured for receiving the control signal and controlling a movement of the support body based on the control signal containing the movement position;
   the control device being further configured for controlling the image acquisition device to move to the preset distance based on the control signal that includes the distance that the image acquisition device needs to move, so as to align the image acquisition device to the device to be calibrated on the vehicle, wherein the position of the image acquisition device is the position of the calibration element.

2. The calibration support according to claim 1, wherein the support body comprises:
   a base comprising a roller, wherein the roller is driven by the control device to roll.

3. The calibration support according to claim 2, wherein the support body further comprises:
a stand assembly mounted to the base and provided in a vertical direction;
wherein the processing device and the control device are provided in the stand assembly, the cross beam assembly mounted to the stand assembly.

4. The calibration support according to claim 3, wherein the cross beam assembly is movable in the vertical direction relative to the stand assembly;
wherein a moving distance of the cross beam assembly in the vertical direction is determined by the processing device, or the cross beam assembly is driven by the control device to move.

5. The calibration support according to claim 3, wherein the cross beam assembly is rotatable about a central axis of the stand assembly to cause the cross beam assembly to be perpendicular to a central plane of the vehicle;
wherein a rotation angle of the cross beam assembly about the central axis of the stand assembly is determined by the processing device, or the cross beam assembly is driven by the control device to rotate about the central axis of the stand assembly.

6. The calibration support according to claim 3, further comprising a trimming assembly which is mounted to the stand assembly and configured for driving the cross beam assembly to move relative to the stand assembly in a horizontal direction, the horizontal direction being perpendicular to the vertical direction.

7. The calibration support according to claim 3, further comprising a driving mechanism which is mounted to the stand assembly and configured for driving the cross beam assembly to move.

8. The calibration support according to claim 7, wherein the control device, based on the control signal, is capable of controlling the driving mechanism to drive the cross beam assembly to move in the vertical direction, thereby driving the cross beam assembly to move a predetermined distance in the vertical direction.

9. The calibration support according to claim 7, wherein the control device, based on the control signal, is capable of controlling the driving mechanism to drive the cross beam assembly to rotate by a predetermined angle around a central axis of the stand assembly.

10. The calibration support according to claim 1, wherein a moving distance of the sliding block in the horizontal direction along the horizontal guide rail is determined by the processing device, or the sliding block is driven by the control device to move in the horizontal direction along the horizontal guide rail.

11. A positioning method for a calibration element, wherein the method is applied to the calibration support according to claim 1, the method comprising steps as follows:
the image acquisition device acquiring an outer contour image of the vehicle;
the processing device determining a position of the image acquisition device relative to a central line of the vehicle according to the outer contour image of the vehicle;
the processing device determining a position of the calibration support relative to the central line of the vehicle according to the position of the image acquisition device relative to the central line of the vehicle and a center position of the image acquisition device relative to the calibration support;
the processing device determining first movement information about the calibration support according to the position of the calibration support relative to the central line of the vehicle and a first preset position of the calibration support relative to the central line of the vehicle, and outputting a first control instruction containing the first movement information to the control device; and
the control device controlling the calibration support to move to the first preset position according to the first control instruction;
wherein after the control device controls the calibration support to move to the first preset position according to the control instruction, the method further comprises steps as follows;
the image acquisition device acquiring an image of equipment to be calibrated on the vehicle;
the processing device determining the position of the image acquisition device relative to the equipment to be calibrated according to the image of the equipment to be calibrated;
the processing device determining second movement information about the image acquisition device relative to the calibration support according to the position of the image acquisition device relative to the equipment to be calibrated and a second preset position of the calibration element relative to the equipment to be calibrated, and outputting a second control instruction containing the second movement information to the control device; and
the control device controlling the image acquisition device to move to the second preset position according to the second control instruction;
wherein the first preset position is a calibration position of the calibration support relative to the vehicle, and the second preset position is a calibration position of the calibration element relative to the equipment to be calibrated.

* * * * *